Patented Jan. 20, 1953

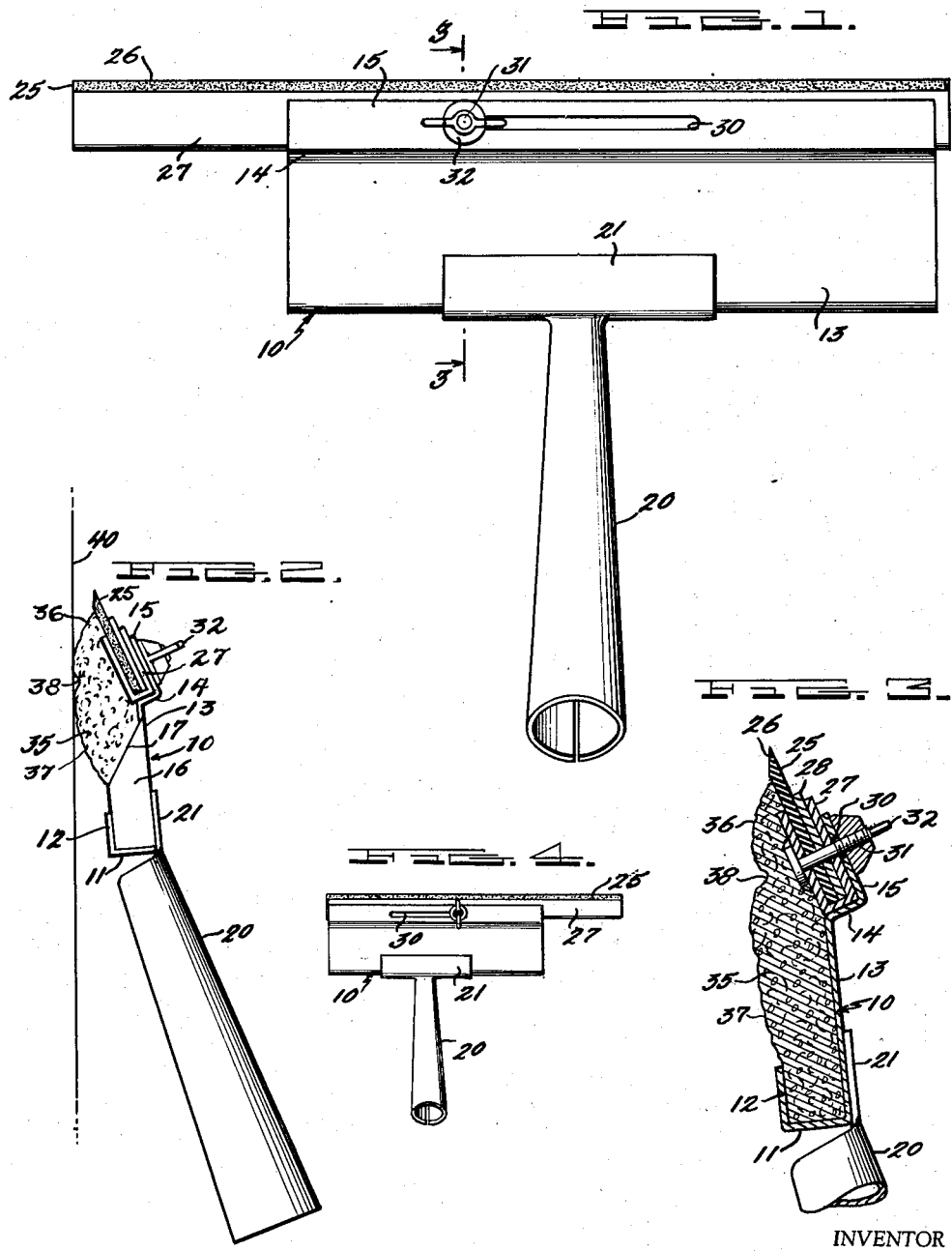

2,625,700

UNITED STATES PATENT OFFICE 2,625,700

WINDOW WASHING AND DRYING DEVICE

Francis W. Baldwin, Huntingdon, Pa.

Application July 11, 1949, Serial No. 103,975

10 Claims. (Cl. 15—121)

This invention relates to a combined window cleaning and drying implement, and more particularly to an implement for washing and simultaneously squeegeeing windows.

An important object of the present invention is to provide a novel single implement embodying a highly absorbent washing element combined in a novel manner with a squeegee whereby, through a single vertical stroke of the implement over a window, the surface of the glass may be cleaned by the absorbent element, followed in its downward movement by the squeegee which immediately removes the cleaning liquid from the window and dries the latter.

A further object is to provide a novel device of this character wherein the squeegee and cleaning element are so related and adjustable with respect to each other as to greatly facilitate the drying of the window without streaking.

A further object is to provide such an implement wherein the squeeze can be adjusted to project beyond the cleaning element so that upon downward movement of the implement over successive paths, the projecting end of the squeegee overlaps each preceding path of the cleaning element to more effectively remove the cleaning liquid from and dry the surface of the window pane, without streaking.

A further object is to provide an implement of the character referred to which is highly simplified in construction and is so compact in form as to be light and readily usable with a minimum amount of work.

Other objects and advantages of the present invention will become apparent during the course of the following description.

In the drawing, I have shown one embodiment of the invention. In this showing,

Figure 1 is a plan view of the device,

Figure 2 is a side elevation of the same,

Figure 3 is a section taken on line 3—3 of Figure 1, and

Figure 4 is a view similar to Figure 1, on a substantially reduced scale, showing the squeegee in a position projecting from the side of the implement opposite to that shown in Figure 1.

Referring to the drawing, the numeral 10 designates the body of the device as a whole, which may be formed of sheet metal, plastic or any other suitable material. The body 10 comprises a bottom 11 (Figure 3), a relatively short upstanding forward wall 12, and a back wall 13, parallel to the wall 12 and preferably perpendicular to the bottom wall 11. The rear wall 13 has a shoulder or wall portion 14 extending outwardly at an angle of approximately 60° relative to the main portion of the wall 13. Above the wall portion 14, the rear wall extends upwardly and forwardly to form a flange 15 arranged approximately perpendicular to the wall portion 14 and approximately at an angle of 30° to the lower portion of the wall 13. The body 10 is provided with end walls 16, formed as extensions on the rear wall 13 and partially closing the ends of the body and having its lower and forward edges lying above and rearwardly of the respective wall portions 11 and 12. The end walls 16 have their upper edges sloping upwardly and rearwardly as at 17.

The device is provided with a handle socket 20, also preferably formed of sheet material of any desired type and preferably tapered as clearly shown in Figures 1 and 2. This socket is provided for the reception of a tapered end of a suitable handle (not shown) which may be of wood or any other suitable material. At its upper end, the socket is provided with a flat attaching head 21, adapted to lie flat against the rear face of the rear wall 13. Where the material is made of metal, the head 21 may be spot-welded to the rear wall 13. It also will be apparent that if the body of the device is made of sheet steel bent in the form shown, the walls 11 and 12 may be spot-welded to the edges of the end walls 16. These elements may be made integral, of course, if the body of the device is molded of plastic or similar material.

A squeegee 25 is arranged in the position shown in Figures 2 and 3 and is provided with a relatively sharp edge 26. This squeegee has its lower edge portion arranged in a carrier 27, substantially coincident in length with the squeegee and of substantially U-shaped cross section. The squeegee has its back face arranged against a backing strip 28 arranged between the squeegee and the rear wall of the carrier 27. Such rear wall of the carrier seats against the wall portion 15, while the bottom of the carrier seats against the wall or shoulder portion 14.

As clearly shown in Figures 1 and 4, the squeegee 25 and its carrier 27 are substantially longer than the body 10. These elements are adapted to project substantially beyond either end of the body and for this purpose are slidably adjustably mounted relative to the body. The flange or wall portion 15 is slotted parallel to the shoulder 14 as at 30, and a bolt 31 passes through the carrier 27, squeegee 25 and backing strip 28 and through the slot 30. The bolt 31 is provided with a wing nut 32 by means of which the squeegee may be tightened in any adjusted position.

The device is further provided with a cleaning element 35 shaped generally as shown in Figures 2 and 4. This cleaning element is preferably formed of cellulose sponge of a type adapted to retain its form when wet. The sponge 35 has its lower end compressed somewhat for reception in the pocket formed between the end walls 16 and the adjacent body walls 11, 12 and 13, such pocket forming a holder or socket for the sponge. The sponge is formed to substantially fit the parts of the device including the squeegee and its carrier and the end wall 13, the back wall of the sponge being angled so as to substantially fit the elements referred to. The working face of the sponge has upper and lower bulged portions 36 and 37 provided with an intermediate groove 38 for a purpose to be described.

*Operation*

Holding the device by the handle (not shown) the operator will dip the sponge in a suitable cleaning solution, which may be water containing a suitable detergent such as dissolved powdered soap or the like. Removing the device from such solution, the operator will run a cloth along the free edge of the squeegee 25 to remove excess liquid therefrom.

The device will then be placed in position against a window pane approximately in the position shown in Figure 2, the surface of the pane being indicated in such figure by the numeral 40. Pressing the device against the pane, the sponge 35 can be deformed to bring the squeegee into position against the surface of the pane. This operation is started at the top of a window pane and at one vertical edge thereof. This may be either the right or left hand edge of the pane, and it will be assumed that the cleaning operation is started with the parts in the position shown in Figure 4, at the extreme upper left hand corner of the window pane. The operator will move the device vertically downwardly over the surface of the pane while maintaining the sponge under some pressure against the pane. The sponge will loosen the dirt on the window and through its own scrubbing action as it moves downwardly, practically all of the dirt will be removed. The function of the groove 38 is such as to maintain a small body of liquid detergent in direct contact with the surface of the glass to increase the effectiveness of the washing action. The bulged faces 36 and 37 provide, in effect, to separate cleaning elements, the lower of which removes most of the dirt from the window. The presence of a small amount of liquid cleansing composition in the groove 38, preceding the bulged face 36 in its downward movement, assists the face portion 36 in completing the cleaning operation.

The squeegee, following behind the cleaning element, will remove residual cleaning liquid from the surface of the window, leaving the surface dry behind the path of movement of the implement. As soon as the sponge comes into contact with the lower frame of the window, the operator will swing the handle outwardly, maintaining the edge of the squeegee in contact with the surface of the window until it reaches the bottom frame of the window.

The operator is now ready to clean the second vertical path of the window. If the window is quite soiled, the sponge may be dipped into the cleaning solution after its movement through each vertical path. Before cleaning the second path, the operator will loosen the nut 32, if it has been tightened, and will slide the squeegee and its carrier to its extreme left hand position, shown in Figure 1, whereupon the device is placed at the top of the window pane with the left hand edge of the sponge as viewed in Figure 1 slightly overlapping the previous vertical strip of cleaned glass. The device is then moved downwardly over the window pane in the manner previously described to clean a second vertical path or area of the surface of the glass. This operation is repeated until the entire surface of the glass has been cleaned.

Particular attention is invited to the fact that in each operation of the device after the first vertical path over the glass surface has been cleaned, the projecting end of the squeegee will substantially overlap the path previously cleaned. This completely insures against the flow of liquid beyond the ends of the squeegee over a previously cleaned path if any liquid is expressed laterally of the window from the end of the sponge. In other words, the projecting end of the squeegee extends beyond any portion of a previously cleaned path which may have liquid thereon, thus insuring the complete drying of the window as the cleaning operation progresses. After the last path of the window has been cleaned, the operator may swing the handle outwardly to such an angle that the squeegee may contact the surface of the glass without any contact of the sponge therewith. Holding the implement in such position and starting at the top of the pane, the operator may move the squeegee downwardly over the path last cleaned to insure the removal of any liquid which may remain on the extreme edge of the window pane.

Accordingly, it will be apparent that the present device is extremely simple in construction and easy to use for the very rapid and efficient cleaning of window panes. The extension of the squeegee beyond the limits of the body 10 does not materially add to the bulkiness of the device and it insures a complete washing and drying of the window. The slidable mounting of the squeegee insures the cleaning of each pane of glass to each extremity thereof. The operation of sliding the squeegee in either direction is extremely easy and may be accomplished merely with the flick of a finger.

After substantial use, either the sponge or the squeegee, or both, may be readily replaced by the operator. It merely is necessary to acquire replacement elements and to place them in position, this operation requiring no skill. The new sponge may have its lower end merely forced into position into the body socket provided for this purpose and the squeegee and its carrier are readily removable by removing the bolt 31 and placing a new squeegee in position. The body of the device and the handle socket, of course, will last indefinitely.

I claim:

1. A window cleaning and drying implement comprising an absorbent cleaning element, a holder therefor, a squeegee above said cleaning element and arranged at the same side of said holder as said cleaning element, said cleaning element and squeegee being disposed for simultaneous engagement with a surface to be cleaned, and means for supporting said squeegee by said holder for longitudinal movement relative to said holder, said squeegee being longer than said cleaning element whereby, when said squeegee is moved in one direction to a point where one end of said squeegee is adjacent the corresponding end of said cleaning element, the other end of said squeegee projects substantially beyond the other end of said cleaning element.

2. A window cleaning and drying implement comprising an absorbent cleaning element, a holder therefor, a squeegee, a carrier therefor, said squeegee being longer than said cleaning element, and a fastening element passing through said carrier, said holder having a slot through which said fastening element passes to connect said squeegee to said holder for sliding movement between two positions in either of which it projects beyond one side of said cleaning element, said cleaning element and said squeegee being at the same side of said holder and disposed for simultaneous engagement with a surface to be cleaned whereby such surface may be simultaneously cleaned and squeegeed upon each operative stroke of the implement.

3. A window cleaning and drying implement comprising an absorbent cleaning element, a holder therefor, a squeegee, a carrier therefor, said squeegee being longer than said cleaning element, and a fastening element passing through said carrier, said holder having a slot through said fastening element passes to connect said squeegee to said holder for sliding movement between two positions in either of which it projects beyond one side of said cleaning element, said holder having portions contacting said carrier to guide it for linear movement between said two positions and to fix it against movement relative to said holder except in such linear movement, said cleaning element and said squeegee being at the same side of said holder and disposed for simultaneous engagement with a surface to be cleaned whereby such surface may be sumultaneously cleaned and squeegeed upon each operative stroke of the implement.

4. A window cleaning and drying device comprising a holder formed of sheet material and having its lower portion formed as a socket, an absorbent cleaning element carried by said holder and having its lower portion arranged in said socket, said holder above said socket having one face open to expose said cleaning element for contact with the surface to be cleaned, and a squeegee arranged above the open face of said holder and on the same side thereof as said cleaning element for simultaneously cleaning and squeegeeing a window, said squeegee being connected to said holder for sliding movement relative thereto to project beyond either side thereof, and being longer than said cleaning element.

5. A window cleaning and drying device comprising a holder formed of sheet material and having its lower portion formed as a socket, an absorbent cleaning element carried by said holder and having its lower portion arranged in said socket, said holder above said socket having one face open to expose said cleaning element for contact with the surface to be cleaned, a squeegee arranged above the open face of said holder and on the same side thereof as said cleaning element for simultaneously cleaning and squeegeeing a window, a carrier for said squeegee, and means connecting said carrier to said holder for sliding movement relative thereto to project from either side thereof, and being longer than said cleaning element.

6. A window cleaning and drying device comprising a holder formed of sheet material and having its lower portion formed as a socket, an absorbent cleaning element carried by said holder and having its lower portion arranged in said socket, said holder above said socket having one face open to expose said cleaning element for contact with the surface to be cleaned, a squeegee arranged above the open face of said holder and on the same side thereof as said cleaning element for simultaneously cleaning and squeegeeing a window, a carrier for said squeegee, and a bolt passing through said carrier, said holder at the side thereof opposite said face having a slot through which said bolt projects and the last-named side of said holder having portions parallel to said slot for guiding said carrier for sliding movement for the projection of said squeegee from either side of said holder, and being longer than said cleaning element.

7. A window cleaning and drying device comprising a holder formed of sheet material and having its lower portion formed as a socket, an absorbent cleaning element carried by said holder and having its lower portion arranged in said socket, said holder above said socket having one face open to expose said cleaning element for contact with the surface to be cleaned, a squeegee arranged above the open face of said holder and of a length greater than the length of said cleaning element, a carrier for said squeegee, said holder having a back wall opposite said open face, the upper portion of said back wall projecting laterally and then upwardly to form a shoulder and flange respectively, said carrier engaging said shoulder and said flange to be guided thereby for sliding movement for projection beyond either side of said holder, said flange being provided with a slot parallel to said shoulder, and a bolt passing through said carrier and through said slot.

8. A window cleaning and drying device comprising a holder having an upwardly opening socket in the bottom thereof and being provided above said socket with an open front face, a deformable cleaning element of sponge material of such nature as to retain its form when wet and having its lower end deformed and received in said socket, the portion of said cleaning element exposed through the open face of said holder having preformed upper and lower horizontal portions vertically bulged convexly and forming a groove therebetween, and a squeegee carried by the upper portion of said holder and having a working edge lying above the upper bulged portion of said cleaning element, said squeegee being of a length greater than the width of said holder and longitudinally slidably connected to said holder for projection beyond either side of said holder.

9. A window cleaning and drying device comprising a holder having an upwardly opening socket in the bottom thereof and being provided above said socket with an open front face, a deformable cleaning element of sponge material of such nature as to retain its form when wet and having its lower end deformed and received in said socket, the portion of said cleaning element exposed through the open face of said holder having preformed upper and lower horizontal portions vertically bulged convexly and forming a groove therebetween, a squeegee arranged above and longer than said cleaning element, a carrier for said squeegee, and means connecting said carrier to said holder for sliding movement longitudinally of said carrier for the projection of the latter beyond either side of said holder, said holder having portions engaging said carrier to guide it in such movement.

10. A window cleaning and drying device comprising a holder having an upwardly opening socket in the bottom thereof and being provided above said socket with an open front face, a deformable cleaning element of sponge material of such nature as to retain its form when wet and having its lower end deformed and received in said socket, the portion of said cleaning element exposed through the open face of said holder having preformed upper and lower horizontal portions vertically bulged convexly and forming a groove therebetween, a squeegee arranged above and longer than said cleaning element, a carrier for said squeegee, said holder having a back wall opposite said open face provided toward the top thereof with an outstanding shoulder and a flange extending thereabove substantially perpendicular thereto, said flange being provided with a slot parallel to said shoulder, and a bolt passing through said carrier and through said slot, said carrier engaging said shoulder and said flange to be guided thereby for movement longitudinally of said squeegee for the projection of the latter from either side of said holder.

FRANCIS W. BALDWIN.

REFERENCES CITED

The following references are of record in the file of this patent:

UNITED STATES PATENTS

| Number | Name | Date |
|---|---|---|
| 1,057,947 | Dietz | Apr. 1, 1913 |
| 1,214,247 | Wescott | Jan. 30, 1917 |
| 1,630,463 | Barlow | May 31, 1927 |
| 1,636,425 | Mayers | July 19, 1927 |
| 1,840,023 | Couture | Jan. 5, 1932 |
| 1,924,337 | Troupa | Aug. 29, 1933 |
| 2,051,058 | Replogle | Aug. 18, 1936 |
| 2,199,147 | Bates | Apr. 30, 1940 |
| 2,230,583 | Borden | Feb. 4, 1941 |
| 2,303,759 | Pippin | Dec. 1, 1942 |
| 2,572,112 | Coppe | Oct. 23, 1951 |

FOREIGN PATENTS

| Number | Country | Date |
|---|---|---|
| 236,731 | Switzerland | July 2, 1945 |
| 248,755 | Great Britain | Mar. 3, 1926 |
| 460,533 | France | Oct. 7, 1913 |